US012569774B2

(12) United States Patent  
Ward

(10) Patent No.: US 12,569,774 B2  
(45) Date of Patent: Mar. 10, 2026

(54) CONCEALMENT OF RIDE VEHICLES IN CLOSE PROXIMITY TO OTHER RIDE VEHICLES

(71) Applicant: DISNEY ENTERPRISES, INC., Burbank, CA (US)

(72) Inventor: John Neil Ward, Burbank, CA (US)

(73) Assignee: DISNEY ENTERPRISES, INC., Burbank, CA (US)

( * ) Notice: Subject to any disclaimer, the term of this patent is extended or adjusted under 35 U.S.C. 154(b) by 402 days.

(21) Appl. No.: 18/229,419

(22) Filed: Aug. 2, 2023

(65) Prior Publication Data

US 2025/0041741 A1 Feb. 6, 2025

(51) Int. Cl.  
*A63G 31/16* (2006.01)  
*H04N 9/31* (2006.01)  
*H04N 13/368* (2018.01)  
*H04N 13/398* (2018.01)

(52) U.S. Cl.  
CPC .......... *A63G 31/16* (2013.01); *H04N 9/3147* (2013.01); *H04N 13/368* (2018.05); *H04N 13/398* (2018.05)

(58) Field of Classification Search  
CPC .... A63G 31/06; H04N 13/368; H04N 13/398; H04N 9/3147  
See application file for complete search history.

(56) References Cited

U.S. PATENT DOCUMENTS

| | | | | |
|---|---|---|---|---|
| 2007/0089630 | A1* | 4/2007 | Gordon | A63G 7/00 |
| | | | | 104/53 |
| 2017/0095742 | A1* | 4/2017 | Boyle | A63G 7/00 |

FOREIGN PATENT DOCUMENTS

| | | | | |
|---|---|---|---|---|
| CN | 106534816 A | * | 3/2017 | ........... H04N 9/3188 |
| RU | 2847122 C1 | * | 9/2025 | |
| WO | WO-2007050545 A2 | * | 5/2007 | ............... A63G 7/00 |

* cited by examiner

*Primary Examiner* — Nathan J Flynn  
(74) *Attorney, Agent, or Firm* — Dorsey & Whitney LLP

(57) ABSTRACT

A method of concealing a first ride vehicle in an amusement park attraction from a second ride vehicle in the amusement park attraction is disclosed herein. The method includes selecting content to project onto the first ride vehicle based at least on a characteristic of the first ride vehicle and projecting the selected content onto the first ride vehicle, where an appearance of the first ride vehicle is modified as viewed from the second ride vehicle by the projected content.

20 Claims, 5 Drawing Sheets

500 ⌒

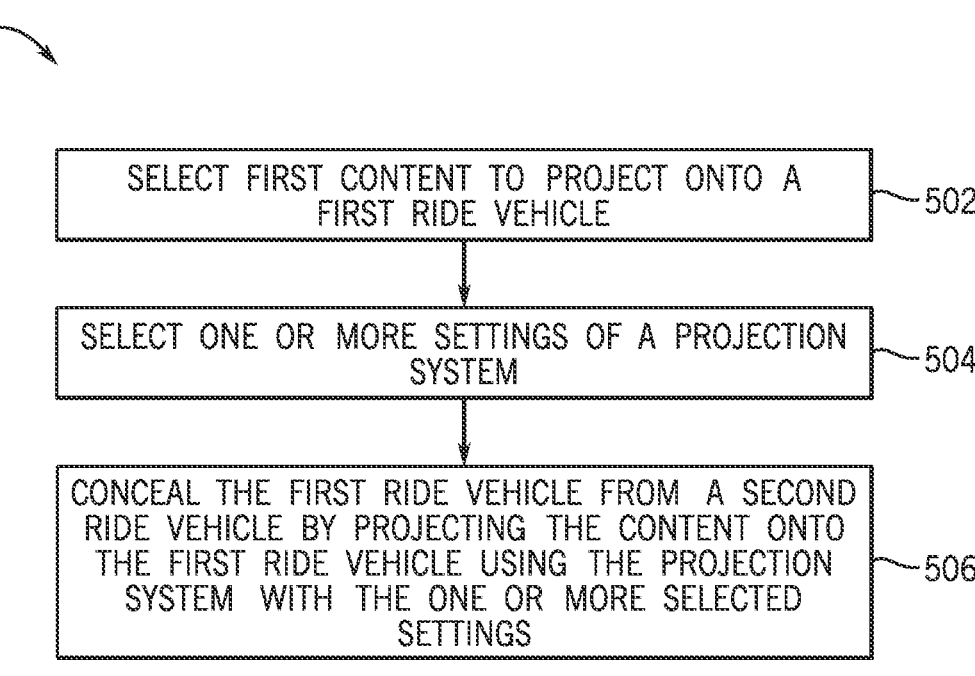

SELECT FIRST CONTENT TO PROJECT ONTO A FIRST RIDE VEHICLE ～502

SELECT ONE OR MORE SETTINGS OF A PROJECTION SYSTEM ～504

CONCEAL THE FIRST RIDE VEHICLE FROM A SECOND RIDE VEHICLE BY PROJECTING THE CONTENT ONTO THE FIRST RIDE VEHICLE USING THE PROJECTION SYSTEM WITH THE ONE OR MORE SELECTED SETTINGS ～506

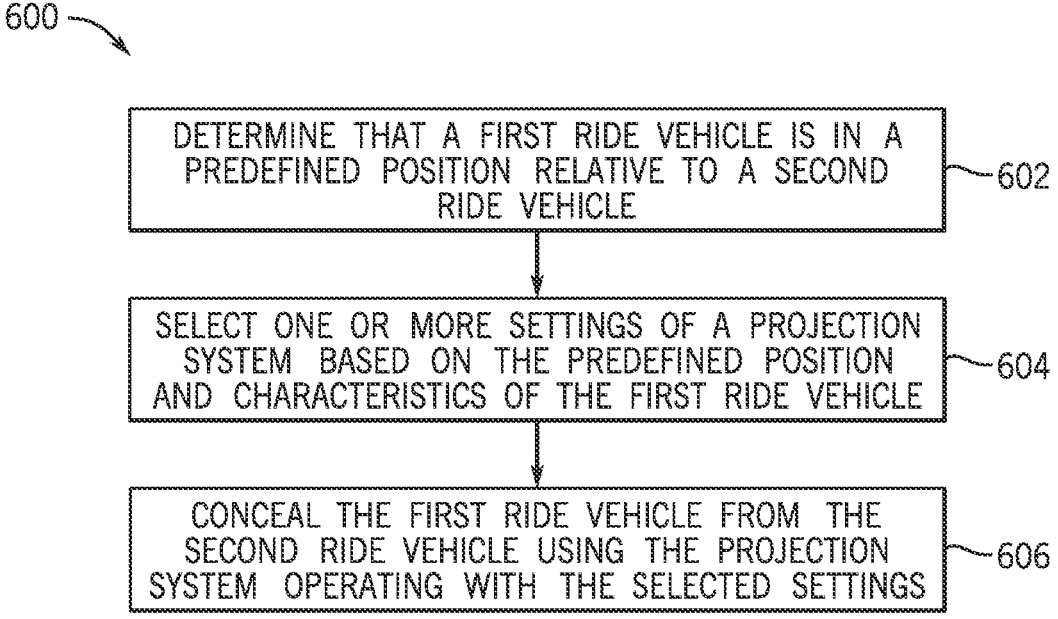

DETERMINE THAT A FIRST RIDE VEHICLE IS IN A PREDEFINED POSITION RELATIVE TO A SECOND RIDE VEHICLE ～602

SELECT ONE OR MORE SETTINGS OF A PROJECTION SYSTEM BASED ON THE PREDEFINED POSITION AND CHARACTERISTICS OF THE FIRST RIDE VEHICLE ～604

CONCEAL THE FIRST RIDE VEHICLE FROM THE SECOND RIDE VEHICLE USING THE PROJECTION SYSTEM OPERATING WITH THE SELECTED SETTINGS ～606

FIG. 6

CONCEALMENT OF RIDE VEHICLES IN CLOSE PROXIMITY TO OTHER RIDE VEHICLES

FIELD

The present application relates to systems and methods of increasing rider throughput and providing immersive experiences in amusement park attractions.

BACKGROUND

Increasing throughput of riders in amusement park attractions generally improves rider experiences by reducing wait times, enabling a larger number of riders able to experience an attraction on a given day, and the like. Rider throughput is often increased through the addition of ride vehicles to an existing attraction or through designing attractions to accommodate a large number of ride vehicles. Creating an immersive experience for riders is difficult with an increase to the number of ride vehicles, as this may cause other ride vehicles to be within eyesight of the riders. Existing strategies to keep riders from seeing other ride vehicles are generally complex, such as programming paths of various ride vehicles to avoid one another, dark ride environments, sophisticated ride vehicles, etc. Such strategies can be expensive to implement, may not allow certain creative themes, as well as may not be applicable to retrofitting of existing attractions, such as attractions using fixed track systems.

BRIEF SUMMARY

A method of concealing a first ride vehicle in an amusement park attraction from a second ride vehicle in the amusement park attraction is disclosed herein. The method includes selecting content to project onto the first ride vehicle based at least on a characteristic of the first ride vehicle and projecting the selected content onto the first ride vehicle, where an appearance of the first ride vehicle is modified as viewed from the second ride vehicle by the projected content.

Optionally, in some embodiments, the content is configured to conceal the appearance of the first ride vehicle as viewed from the second ride vehicle.

Optionally, in some embodiments, the content is further selected based on a location of the first ride vehicle within the amusement park attraction.

Optionally, in some embodiments, the projection system includes at least one of one or more projectors mounted on the second ride vehicle or one or more projectors mounted on a stationary structure within the amusement park attraction.

Optionally, in some embodiments, projecting the selected content onto the first ride vehicle includes projecting the first content onto the first ride vehicle at a first location within the amusement park attraction and projecting second content onto the first ride vehicle at a second location within the amusement park attraction.

Optionally, in some embodiments, the method further includes determining that the first ride vehicle is in a visible position relative to the second ride vehicle, where at least a portion of the first ride vehicle is visible by an occupant of the second ride vehicle when the first ride vehicle is in the visible position relative to the second ride vehicle. The second content may be projected onto the first ride vehicle responsive to the determination that the first ride vehicle is in the visible position relative to the second ride vehicle.

Optionally, in some embodiments, the method further includes selecting one or more settings of the projection system based on the visible position, where the selected content is projected onto the first ride vehicle using the one or more settings.

Optionally, in some embodiments, the visible position includes at least an angle between the first ride vehicle and the second ride vehicle, where selecting the one or more settings of the projection system comprises selecting at least one projector of the projection system based on the angle between the first ride vehicle and the second ride vehicle.

Optionally, in some embodiments, the visible position includes a visible angle and a visible distance between the first ride vehicle and the second ride vehicle.

An amusement park attraction is disclosed herein. The amusement park attraction includes a first ride vehicle, a second ride vehicle, and a projection system configured to conceal the first ride vehicle from the second ride vehicle by projecting content onto the first ride vehicle, where the content is selected based at least on a characteristic of the first ride vehicle.

Optionally, in some embodiments, the projection system includes one or more projectors mounted on the second ride vehicle.

Optionally, in some embodiments, the projection system is configured to project first content onto the first vehicle at a first location within the amusement park attraction and to project second content onto the first ride vehicle at a second location within the amusement park attraction.

Optionally, in some embodiments, the amusement park attraction further includes one or more tracking systems configured to track a location of the first ride vehicle and a location of the second ride vehicle within the amusement park attraction, where the content is further selected based on at least one of the location of the first ride vehicle and the location of the second ride vehicle.

Optionally, in some embodiments, the projection system includes one or more projectors, where the projection system is configured to select one or more settings for the one or more projectors based on the location of the first ride vehicle and the location of the second ride vehicle.

Optionally, in some embodiments, the projection system is configured to project the content onto the first ride vehicle responsive to a detection that the first ride vehicle is in a visible position relative to the second ride vehicle.

A vehicle concealment system for use in an amusement park attraction is disclosed herein. The vehicle concealment system includes a projection control system configured to select content to conceal a first ride vehicle of the amusement park attraction from a second ride vehicle of the amusement park attraction, where the content is selected based at least on a characteristic of the first ride vehicle. The vehicle concealment system further includes one or more projectors configured to conceal the first ride vehicle from the second ride vehicle by projecting the content onto the first ride vehicle.

Optionally, in some embodiments, at least one of the one or more projectors is mounted to the second ride vehicle.

Optionally, in some embodiments, the vehicle concealment system further includes one or more tracking systems configured to track a location of the first ride vehicle and a location of the second ride vehicle within the amusement park attraction, where the content is further selected based on the location of the first ride vehicle within the amusement park attraction.

Optionally, in some embodiments, the projection control system is further configured to select second content to conceal the first ride vehicle from the second ride vehicle at a second location of the first ride vehicle in the amusement park attraction, where the second content is selected based on the second location.

Optionally, in some embodiments, the projection control system is further configured to select the content based on one or more characteristics of the first ride vehicle.

BRIEF DESCRIPTION OF THE SEVERAL VIEWS OF THE DRAWINGS

FIG. 5 is a flow chart of a process for concealing a ride vehicle using the systems disclosed herein, in accordance with various examples of the disclosure.

FIG. 6 is a flow chart of another process for concealing a ride vehicle using the systems disclosed herein, in accordance with various examples of the disclosure.

DETAILED DESCRIPTION

Figure 1:
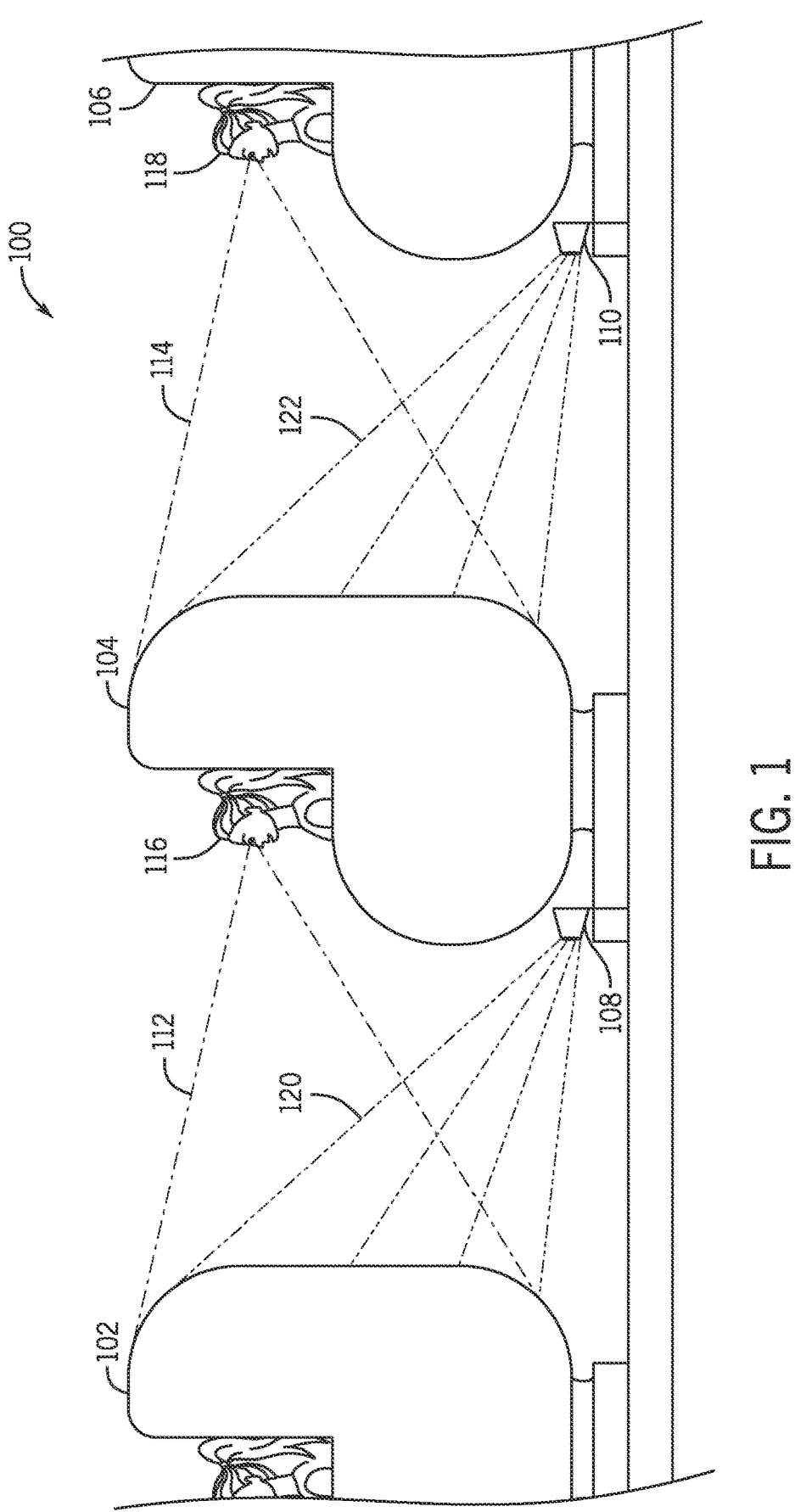
FIG. 1 illustrates an example system for concealing ride vehicles within an amusement park attraction.

Systems and methods described herein may allow for an immersive experience, including one with higher capacity on amusement park attractions for riders experiencing the attractions. For example, a concealment system includes one or more projection systems to conceal ride vehicles from other ride vehicles within the same attraction. The concealment system may include or receive input from various tracking systems to track the location of various ride vehicles of an amusement park attraction. The tracked or otherwise identified location information can be used to determine when to activate various projectors to conceal ride vehicles or create a desired creative effect for ride vehicle as may be detected by riders from other ride vehicles. For example, when two ride vehicles are in locations such that a first ride vehicle is likely to be in view of other riders in the attraction (e.g., those on a second ride vehicle), a projector may be utilized to project content onto the first ride vehicle to conceal its appearance as may be visible to riders, such as those on the second ride vehicle.

As can be appreciated, different projection elements can be used by the concealment system to conceal adjacent ride vehicles. The present disclosure contemplates different types of concealment, including, but not limited to, projected content intended to camouflage or otherwise reduce the appearance of an adjacent ride vehicle and/or enhance the immersiveness of the experience, content displaying graphics on adjacent ride vehicles (e.g., pulling focus of the riders from the structure of an adjacent ride vehicle to the content displayed on the adjacent ride vehicle), and the like. Content may include in various example, one image, multiple images, multiple frames, video content, and the like.

In some examples, the content may be selected to enhance the experience in addition to or separate from concealment. For example, the concealment system may project a pattern of tree branches onto an adjacent ride vehicle when the ride vehicles move through a forest scene. In other examples, the system may project additional information about the attraction onto adjacent ride vehicles, such as safety instructions, closed captioning of narration, rider scores or other information in interactive experiences, and/or other supplemental content. Such supplemental content may be presented in conjunction with concealing content intended to disguise or otherwise camouflage an adjacent ride vehicle, such that the supplemental content does not appear, to the rider, to be projected on an adjacent ride vehicle. For example, a first projector may project a pattern or color onto a ride vehicle intended to camouflage the ride vehicle within the environment of the attraction, while a second projector projects supplemental content onto the ride vehicle. Accordingly, the supplemental content may appear to be "floating" or otherwise projected in the environment rather than being projected on a ride vehicle.

The concealment systems may provide an immersive experience for riders of amusement park attractions, which may also enable a higher volume or throughput (e.g., more ride vehicles) on such attractions. Further, various examples may not rely on modifying or otherwise programming paths of vehicles in order to conceal ride vehicles from other riders in an attraction, e.g., mechanical track configurations may not be required to enable the concealment. Accordingly, such concealment systems may be retrofitted onto existing track-based rides, may be included in new attractions using track based or other linked conveyance systems, and/or may be utilized in new attractions using individualized conveyance (e.g., unplanned or free form rides). In this manner, programming or determining locations of individual ride vehicles within an attraction may be simplified, as the concealment system reduces the need to position ride vehicles such that they are likely to be out of sight of one another as they move through the attraction. In other words, exact spacing of ride vehicles can be less rigid since concealment can be done via content rather than spatial separation between the vehicles.

FIG. 1 illustrates an example system 100 for concealing ride vehicles within an amusement park attraction. Generally, the amusement park attraction includes any number of ride vehicles, such as ride vehicles 102, 104, and 106 of FIG. 1. A vehicle concealment system includes at least a projection system. The projection system may include one or more projectors configured to project content onto ride vehicles to conceal (e.g., hide or mask) ride vehicles from one another in the amusement park attraction. When the content is projected onto a ride vehicle, an appearance of the ride vehicle from another ride vehicle is generally modified as viewed from the other ride vehicle. For example, projector 108 may project content onto the ride vehicle 102 such that the ride vehicle 102 is concealed from the rider 116 in the ride vehicle 104. In some examples (e.g., where the distance between the ride vehicle 102 and the ride vehicle 104 is consistent throughout the amusement park attraction), the projector 108 may continuously project content onto the ride vehicle 102 to conceal the ride vehicle 102 from the ride vehicle 104. A projection control system may select one or more content items to be projected onto the ride vehicle 102 by the projector 108. In some examples, the content being projected may be changed as the ride vehicle 102 and the ride vehicle 104 move through the amusement park attraction.

In some examples, the vehicle concealment system may include a projection system and a tracking system. The tracking system may generally track locations of vehicles 102, 104, and 106 within the amusement park attraction and may communicate such locations to the projection system. The projection system may utilize the vehicle locations to determine when and/or how to activate projection components (e.g., projectors 108 and/or 110) to conceal ride vehicles that may be visible to other riders of the amusement park attraction. The tracking system may, in some examples, track orientation of the ride vehicles throughout the amusement park attraction. The projection system may further utilize the locations and/or orientations to select content for projection. For example, when ride vehicle 102 reaches a distance and/or angle relative to ride vehicle 104 where the ride vehicle 102 is likely to be within the field of view 112 of the rider 116 in the ride vehicle 104, the projection system may cause the projector 108 to display content onto the ride vehicle 102. Such content may conceal (or disguise) the ride vehicle 102 from the rider 116 in the ride vehicle 104.

Vehicle concealment systems described herein may be used with a variety of ride vehicles. Further, similar systems may be utilized to conceal other elements of amusement park attractions from riders. For example, the vehicles 102, 104, and 106 may travel along a fixed track at a constant pace and a fixed distance from one another. In such examples, the vehicle concealment system may continuously conceal adjacent ride vehicles depending on angles between the ride vehicles and/or proximity to ride vehicles other than those directly adjacent to the ride vehicle on the track. For example, the vehicle concealment system may conceal vehicles on parallel or adjacent tracks. In other examples, the ride vehicles 102, 104, and 106 may move in predefined tracks without a track, such as by using global positioning satellite (GPS) components, motion or other presence sensors, emitters located on the ride vehicles emitting information (e.g., light emitting diode (LED) signals indicating location of the ride vehicles), visual markers, or other mechanisms to travel to various points within an attraction. Similarly, the paths of the ride vehicles 102, 104, and 106 may be pre-programmed and the ride vehicles may move using their own respective conveyance systems. In some examples, the ride vehicles 102, 104, and 106 may move along randomized paths such that the ride vehicles 102, 104, and 106 move along different paths during different cycles of the same attraction.

The vehicle concealment system generally includes a projection system including one or more projectors, e.g., projectors 108 and 110. Projectors may be provided anywhere within the amusement park attraction. For example, projectors 108 and 110 are attached to or integrated into ride vehicles 104 and 106, respectively. In various examples, the projection system may further include a projection control system or other computer communicating with the projectors 108 and 110 and/or additional projectors or projection elements within the attraction. For example, the projection control system may determine when to activate the projectors 108 and 110, settings for the projectors 108 and 110, content to be projected by the projectors, and the like. The projection control system may further modify the content to be projected by the projectors 108 and 110, such as by adjusting color, crop, features of the content, and the like based on various information about the vehicles, location of the vehicles, and/or orientation of the vehicles. The projection system may further utilize the locations and/or additional information about ride vehicles (e.g., color, shape, and the like) or the attraction to determine settings for the projectors. Such settings may include angle of projection, frame rate, and the like. In some examples, the projection control system may be integrated into a larger control system for the amusement park attraction as a whole.

Upon activation of the projection components, ride vehicles may be concealed from riders in other ride vehicles in the amusement park attraction. Concealment may camouflage visible parts of a ride vehicle, such as by projecting a color, pattern, or other image onto the ride vehicle such that it does not stand out from a background of the attraction (e.g., blends into or with the background). For example, the projector 108 may project an image of leaves, foliage, or tree branches onto the ride vehicle 102 to make the ride vehicle 102 blend into a forest scene. The projector 108 may similarly project a color onto the vehicle 102 to make the vehicle 102 blend more easily into a background or otherwise less likely to draw the attention of the rider 116 of the vehicle 104. Accordingly, in some examples, the pattern or color projected onto the ride vehicle 102 may be dependent on the location of the ride vehicle 102 and/or the ride vehicle 104 within the amusement park attraction.

In some examples, concealment may further include projecting supplementary content onto a ride vehicle. For example, supplemental content may include graphics, animations, interactive elements (e.g., graphics that riders can interact with using gestures, controllers, or the like), text (e.g., safety instructions, closed captions for narration, or the like), and/or other types of projected content. In some examples, supplemental content may include content which is personalized to a specific rider. Such supplemental content may be projected over top of or in conjunction with other projections such that the supplemental content does not appear to be projected on an adjacent ride vehicle. Accordingly, riders may continue to be provided with an immersive experience in the attraction, while the appearance of other ride vehicles is minimized or reduced.

In some examples, the projection system may compensate for size, shape, or other physical characteristics of ride vehicles. For example, where the projector 108 projects onto a portion of the ride vehicle 102 that is curved or angled (e.g., not flat), the projection control system may cause the projector 108 to scale the content projected onto the ride vehicle 102 such that the image or pattern do not appear distorted to the rider 116. Similarly, the projection control system may cause the projector 108 to adjust a color of the projection to adjust for a color of the ride vehicle 102. The projection control system may further adjust an angle of the projector 108 where the surface of the ride vehicle 102 is, for example, not parallel to the ride vehicle 104.

As shown in FIG. 1, the projectors 108 and 110 may be mounted directly on ride vehicles 104 and 106 respectively. In this configuration, the projectors 108 and 110 may be used to conceal adjacent ride vehicles from the riders 116 and 118 in the vehicles 104 and 106, respectively. Though shown mounted at the base of the ride vehicles 104 and 106, in other examples, projectors 108 and 110 may be mounted on other locations of the ride vehicles 104 and 106, such as at a location above the fields of view of the riders, on the side of the vehicle, and the like. Further, in some examples, multiple projectors may be mounted on a single ride vehicle. For example, a ride vehicle may include three projectors, with one mounted on each side and one mounted on the front of the ride vehicle. Such projectors may be utilized separately or in combination to conceal ride vehicles or other objects on either side and/or in front of the ride vehicle. Where multiple projectors project content onto a ride vehicle, content for the different projectors may be modified based on any overlapping projected areas from each of the projectors.

The projectors 108 and 110 may have capabilities to move (e.g., rotate, pivot horizontally, pivot vertically) respective to a pivot point or the ride vehicles 104 and 106 respectively. Accordingly, the projection control system may adjust angles of projectors 108 and 110 to conceal adjacent vehicles. For example, an angle of the projector 108 may be adjusted when the ride vehicle 102 turns, moves up or down an incline, or otherwise moves at an angle relative to the ride vehicle 104. The angle may be similarly adjusted as the ride vehicle 104 moves relative to the ride vehicle 102 in a manner changing the field of view 112 of the rider 116 in the ride vehicle 104. In some examples, the projection control system may continually adjust the positioning (e.g., angle) of the projector 108 as the ride vehicles 102 and 104 continue to move, even as the projector 108 continues to project content onto the ride vehicle 102. Such angles may generally be chosen such that content projected onto a ride vehicle by a projector overlaps part or all of a field of view of a rider. For example, the projector 108 is angled such that the projection 120 onto the ride vehicle 102 overlaps with the field of view 112 of the rider 116.

The vehicle concealment system may further include a tracking system configured to track the location of ride vehicles respective to one another. The tracking system may include a control component configured to receive input from various sensors, trackers, or other components which may be utilized to track the location of ride vehicles (e.g., ride vehicles 102, 104, and 106) within the amusement park attraction. The control component may utilize such input to determine the location of ride vehicles with respect to one another.

In some examples, the tracking system may include or utilize sensors located within an environment of the attraction. For example, the tracking system may receive sensor information from motion sensors located in the environment of the attraction, from trackers located on the ride vehicles, and the like. In some examples, the tracking system may further utilize information received from a control system controlling the attraction and/or the ride vehicles. In some examples, the tracking system may be part of the control system of the attraction. In operation, the tracking system may continuously track the location of ride vehicles 102, 104, and 106 within the amusement park attraction. For example, the amusement park attraction may include sensors embedded in a track which indicate when a particular ride vehicle has passed the location in the track. In some examples, ride vehicles may include emitters which emit vehicle information, including a location of the vehicle, to the tracking system. Sensors may be mechanical (e.g., mechanically triggered) or digital. In some examples, additional methods may be utilized for tracking, such as video analysis of the ride vehicles moving through the amusement park attraction.

Locations of ride vehicles determined by the tracking system may be utilized by the concealment system (e.g., the projection system, the tracking system, or another control component) to determine when to project content to conceal ride vehicles, the desired settings for projectors, and/or the content to project such that the projected content conceals ride vehicles from other riders. The concealment system may maintain a database of content tagged with particular locations in the amusement park attractions and/or other conditions under which such content should be chosen for projection onto a ride vehicle. The projection control system may select content from such a database based on location or other information about ride vehicles. The concealment system may further maintain a database or other data location including visible positions between various ride vehicles. The visible positions may be chosen such that when the ride vehicles are in the visible positions, at least one of the ride vehicles is within a field of view of a rider in another ride vehicle. For example, ride vehicle 102 is in a visible position relative to the ride vehicle 104 (and vice versa) as the ride vehicle 102 is in the field of view 112 of the rider 116 of the ride vehicle 104.

Visible positions may be defined in several dimensions. For example, a visible position may be expressed as a distance and orientation (e.g., angles of pitch, roll, and yaw offsets of the ride vehicles) and may be expressed in various coordinate systems. Accordingly, the visible positions may account for elevation changes, vehicle rotations in several dimensions, and distance between vehicles within an attraction.

Generally, when the concealment system detects that two ride vehicles are in a visible position, the projection system determines settings for one or more projectors to conceal at least one of the ride vehicles from the other. In some examples, a visible position may be such that both ride vehicles are concealed from one another. For example, when the ride vehicle 104 reached a visible position relative to the ride vehicle 102, the projection system may determine that projector 108 may be used to conceal the ride vehicle 102 from the rider 116 in the ride vehicle 104. The projector 108 may be chosen based on its field of projection 120 being able to conceal the ride vehicle 102, its abilities, (e.g., ability to adjust angle, project certain content, move relative to the ride vehicle 102) and the like. The projection system may, in some examples, select multiple projectors to conceal a ride vehicle based on the field of projection of the projectors, the content to be projected to conceal the ride vehicle, and the like.

The projection system may select content based on the visible position, locations of the ride vehicles, characteristics of the ride vehicles, and the like. The projection system may further select settings for the selected projectors. Some settings may be selected based on the visible position and/or the locations of the ride vehicles. For example, an angle of the projector 108 may be selected relative to the ride vehicle 104 such that the field of projection 120 of the projector 108 conceals the ride vehicle 102 from the rider 116 of the ride vehicle 104. For example, the angle of the projector 108 may be chosen such that the field of projection 120 overlaps the field of view 112 of the rider 116. Content may further be selected based on one or more characteristics of the ride vehicle 102 being concealed by the projector 108. For example, a brightness, color correction, scaling, or other settings may be chosen based on the color, shape, or other characteristics of the ride vehicle 102. For example, scaling settings for projected content may be selected based on the shape of the ride vehicle 102, such that the projections do not appear distorted to the rider 116.

In some examples, the concealment system 100 may include additional components used to conceal adjacent ride vehicles. For example, smoke effects, lighting effects, physical objects within the environment, and the like may be used in conjunction with projections generated by the projection system to further conceal adjacent ride vehicles.

Figure 2:
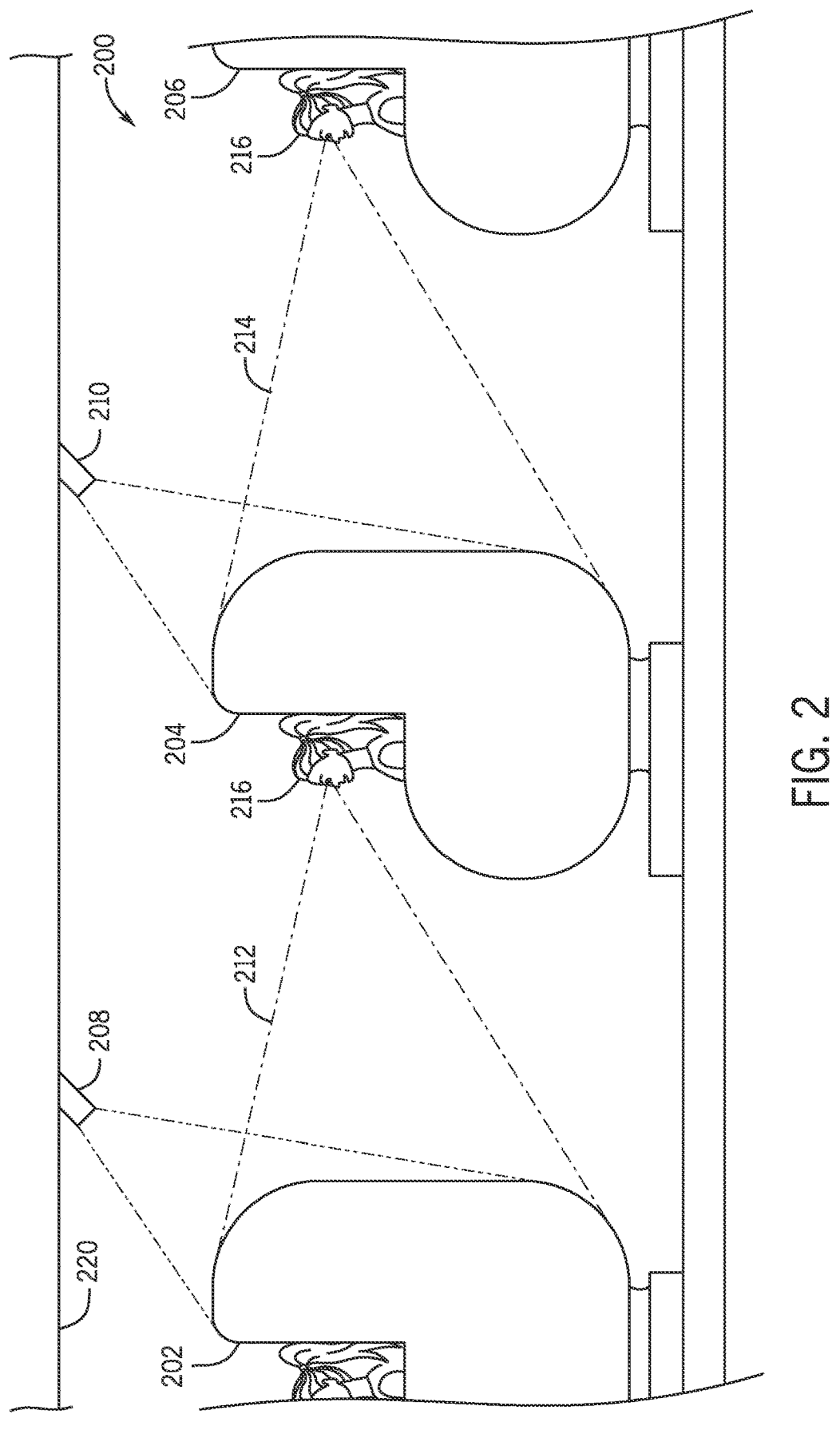
FIG. 2 illustrates an additional example system for concealing ride vehicles within an amusement park attraction.

Though the projectors 108 and 110 are shown in FIG. 1 as being mounted on ride vehicles 104 and 106, respectively, projectors may be mounted in other locations in an amusement park attraction, in various examples. For example, FIG. 2 illustrates an implementation of the system 200 where projectors 208 and 210 are mounted to other structures of the attraction, such as overhead. In this example, the projector 208 projects content onto the ride vehicle 202 to conceal the ride vehicle 202 from the rider 216 within the ride vehicle 204. Though the projectors 208 and 210 are shown as mounted overhead with respect to the ride vehicles 202, 204, and 206, in various examples, projectors may be mounted or located in other positions within the environment of the attraction. For example, projectors may be placed on the floor of the attraction, mounted to the walls, mounted on other elements of the attraction, and the like.

As shown in FIG. 2, the projectors 208 and 210 may be mounted to a ceiling 220 of the attraction. The projectors 208 and 210 may rotate and/or pivot with respect to the ceiling 220, such that a projection control system may adjust angles of the projectors 208 and 210 to conceal ride vehicles at various angles relative to the projectors 208 and 210. In some examples, such angles may be continuously adjusted such that the projectors may "follow" ride vehicles as they move under the projectors 208 and 210. Generally, a projector control system may choose such angles such that content projected onto a ride vehicle overlaps part of all of a field of view of a rider.

In some examples, projectors 208 and 210 located in the environment of the attraction may be mounted or otherwise connected to tracks, conveyance systems, and/or other moving structures. Accordingly, the projectors 208 and 210 may move at a rate similar to the ride vehicles 202 and 204, continuously concealing the ride vehicles 202 and 204 from the rider 216 and the rider 218, respectively. In these examples, the projectors 208 and 210 may move along with the ride vehicles 202 and 204 as long as the ride vehicles 202 and 204 are in a visible position relative to one another. As the positioning between the ride vehicles changes (e.g., the angle or distance between the ride vehicles 202 and 204), the projectors 208 and 210 may adjust accordingly by, for example, rotating relative to the ceiling 220, speeding up or slowing down a conveyance system including the projectors 208 and 210, and/or stopping the projection from the projectors 208 and 210 (e.g., when the positioning between the ride vehicles 202 and 204 is such that the ride vehicle 202 is no longer in the line of sight 212 of the rider 216).

Figure 3:
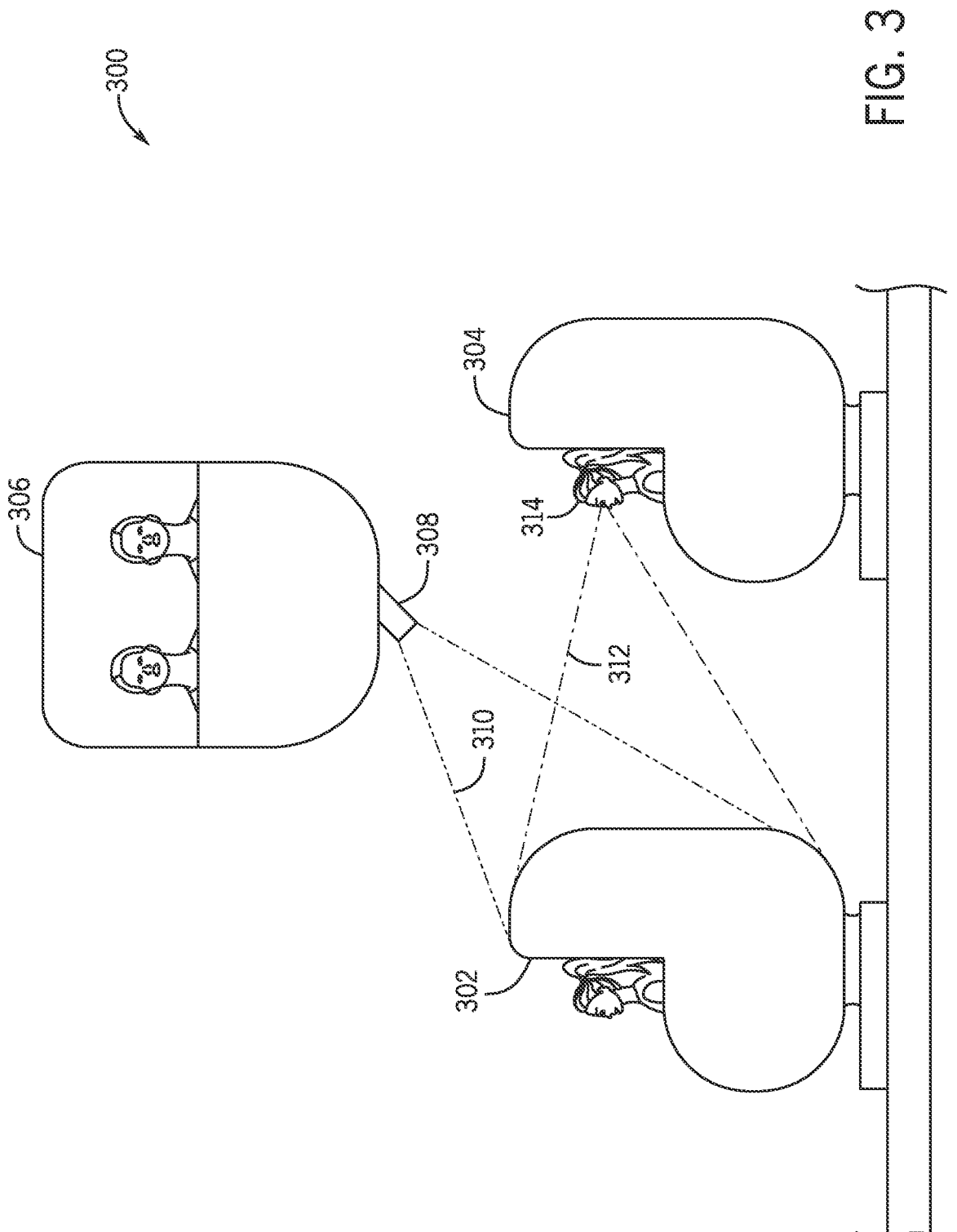
FIG. 3 illustrates an additional example system for concealing ride vehicles within an amusement park attraction.

FIG. 3 illustrates an additional example of mounting locations of projectors within an amusement park attraction. As shown in FIG. 3, in some examples, a projector 308 mounted to a ride vehicle 306 may be utilized to conceal a first ride vehicle 302 from riders or occupants of a second ride vehicle 304. In various example, the projection system may utilize a projector 308 mounted on a third ride vehicle 306 based on the location of the third ride vehicle 306 with respect to the first ride vehicle 302 and the second ride vehicle 304. For example, the projection system may utilize the projector 308 when the third ride vehicle 306 is located in a position where the projector 308 can be adjusted to project onto the first ride vehicle 302 with a field of projection 310 that conceals the first ride vehicle 302 from the rider 314 of the second ride vehicle 304. For example, the field of projection 310 of the projector 308 may overlap the field of view 312 of the rider 314.

In some examples, additional projectors may be included in a projection system. For example, the projection system may include projectors mounted to ride vehicles (e.g., projectors 108 and 110 of FIG. 1 and/or projector 308 of FIG. 3) and projectors mounted in other locations in the amusement park attraction (e.g., projectors 208 and 210 in FIG. 2). In such examples, projectors used for ride vehicle concealment may be chosen by the projection system. For example, the projection settings may include a selection of projectors that may be utilized to conceal a ride vehicle from occupants of another ride vehicle. In some examples, output from multiple projectors may be combined to conceal a ride vehicle and/or to provide additional information to occupants of ride vehicles. For example, a projector mounted within the environment of the amusement park attraction may project a pattern onto a first ride vehicle to conceal the structure of the first ride vehicle from riders in a second ride vehicle, while a projector mounted to the second ride vehicle may project images, writing (e.g., safety instructions, closed captioning for narration, supplemental information about the attraction), and/or other graphics onto the first ride vehicle for viewing by the riders in the second ride vehicle. In some examples, projections from multiple projectors may be combined to completely cover a field of view of a rider. For example, a first projector may project content overlapping with a top half of a rider's field of view while a second projector may project content overlapping with a bottom half of the rider's field of view.

Figure 4:
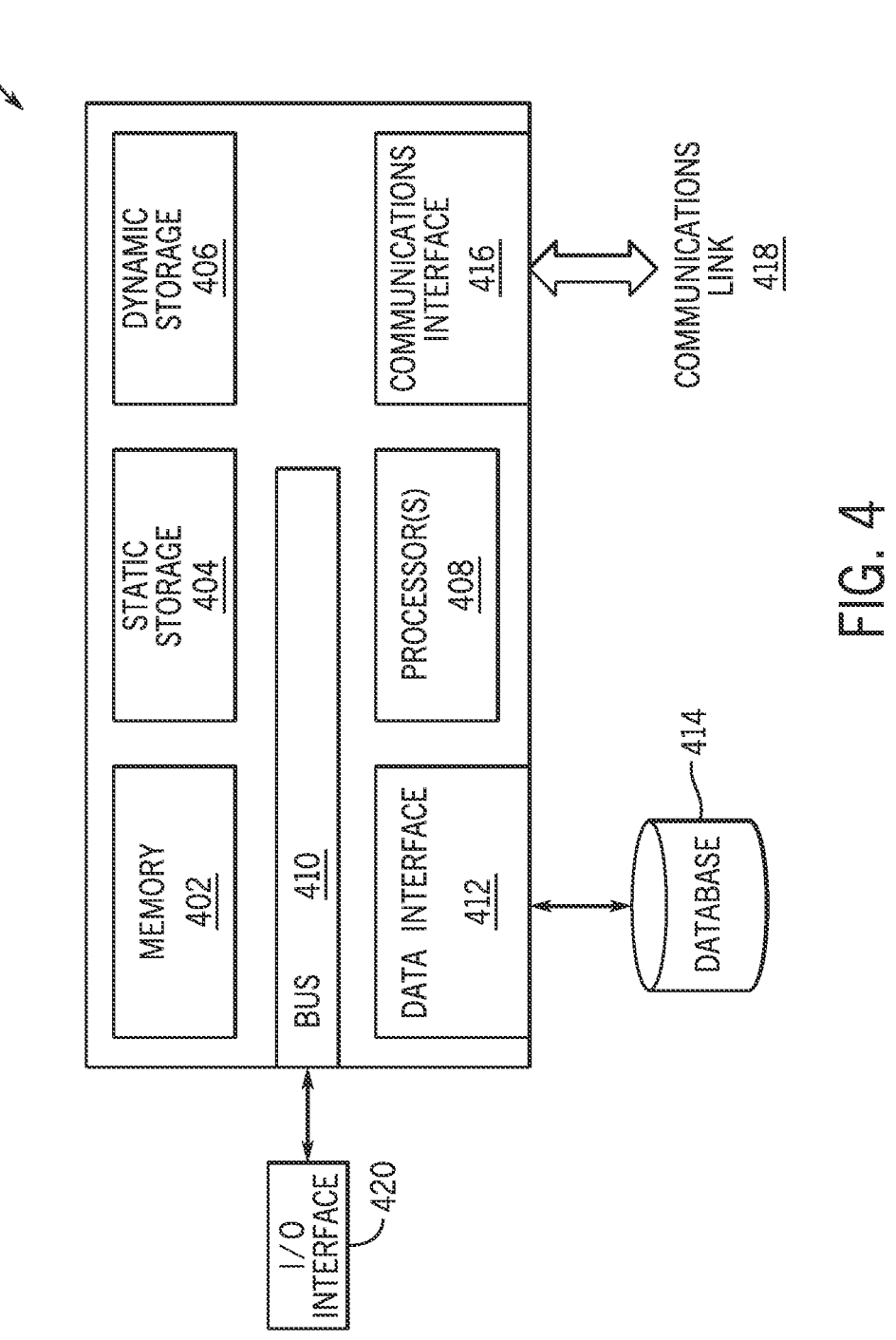
FIG. 4 is an example computing system used in various examples of the disclosure.

Turning to FIG. 4, an example computing system 400 may be used for implementing various embodiments in the examples described herein. For example, in various embodiments, components of the tracking system and/or the projection system may be implemented by one or several computing systems 400. This disclosure contemplates any suitable number of computing systems 400. For example, the computing system 400 may be a server, a desktop computing system, a mainframe, a mesh of computing systems, a laptop or notebook computing system, a tablet computing system, an embedded computer system, a system-on-chip, a single-board computing system, or a combination of two or more of these. Where appropriate, the computing system 400 may include one or more computing systems; be unitary or distributed; span multiple locations; span multiple machines; span multiple data centers; or reside in a cloud, which may include one or more cloud components in one or more networks.

Computing system 400 includes a bus 410 (e.g., an address bus and a data bus) or other communication mechanism for communicating information, which interconnects subsystems and devices, such as processor 408, memory 402 (e.g., RAM), static storage 404 (e.g., ROM), dynamic storage 406 (e.g., magnetic or optical), communications interface 416 (e.g., modem, Ethernet card, a network interface controller (NIC) or network adapter for communicating with an Ethernet or other wire-based network, a wireless NIC (WNIC) or wireless adapter for communicating with a wireless network, such as a WI-FI network), input/output (I/O) interface 420 (e.g., keyboard, keypad, mouse, microphone). In particular embodiments, the computing system 400 may include one or more of any such components.

In particular embodiments, processor 408 includes hardware for executing instructions, such as those making up a computer program. For example, a processor 408 may execute instructions for various components of a ride concealment system. The processor 408 circuitry includes circuitry for performing various processing functions, such as executing specific software to perform specific calculations or tasks. In particular embodiments, I/O interface 420 includes hardware, software, or both, providing one or more interfaces for communication between computing system 400 and one or more I/O devices. Computing system 400 may include one or more of these I/O devices, where appropriate. One or more of these I/O devices may enable communication between a person and computing system 400.

In particular embodiments, the communications interface 416 includes hardware, software, or both providing one or more interfaces for communication (such as, for example, packet-based communication) between computing system 400 and one or more other computer systems or one or more networks. One or more memory buses (which may each include an address bus and a data bus) may couple processor 408 to memory 402. Bus 410 may include one or more memory buses, as described below. In particular embodiments, one or more memory management units (MMUs) reside between processor 408 and memory 402 and facilitate accesses to memory 402 requested by processor 408. In particular embodiments, bus 410 includes hardware, software, or both coupling components of computing system 400 to each other.

According to particular embodiments, computing system 400 performs specific operations by processor 408 executing one or more sequences of one or more instructions contained in memory 402. For example, instructions for the tracking system may be contained in memory 402 and may be executed by the processor 408. Such instructions may be read into memory 402 from another computer readable/usable medium, such as static storage 404 or dynamic storage 406. In alternative embodiments, hard-wired circuitry may be used in place of or in combination with software instructions. Thus, particular embodiments are not limited to any specific combination of hardware circuitry and/or software. In various embodiments, the term "logic" means any combination of software or hardware that is used to implement all or part of particular embodiments disclosed herein.

The term "computer readable medium" or "computer usable medium" as used herein refers to any medium that participates in providing instructions to processor 408 for execution. Such a medium may take many forms, including but not limited to, nonvolatile media and volatile media. Non-volatile media includes, for example, optical or magnetic disks, such as static storage 404 or dynamic storage 406. Volatile media includes dynamic memory, such as memory 402.

Computing system 400 may transmit and receive messages, data, and instructions, including program, e.g., application code, through communications link 418 and communications interface 416. Received program code may be executed by processor 408 as it is received, and/or stored in static storage 404 or dynamic storage 406, or other storage for later execution. A database 414 may be used to store data accessible by the computing system 400 by way of data interface 412. For example, projection settings and visible positions of ride vehicles may be stored using a database 414. In various examples, communications link 418 may communicate with the vehicle concealment system, the projection system, the tracking system, and/or other ride control systems used by an amusement park attraction.

FIG. 5 illustrates an example process 500 for concealing a ride vehicle using a vehicle concealment system described herein. At block 502, the vehicle concealment system selects content to project onto a first ride vehicle. In various examples, the content may be chosen from predetermined content which is identified for use in particular configurations of ride vehicles, locations within the amusement park attraction, in particular situations, or the like. For example, content may be chosen to effectively conceal a ride vehicle in a particular area of the amusement park attraction, such as by causing the ride vehicle to blend into a background of such an area. Content may further be chosen based on characteristics of the ride vehicle being concealed. For example, scaled content, cropped content, and/or warped content may be chosen based on the shape of the ride vehicle. Similarly, color corrected content may be selected based on a color of the ride vehicle. In some examples, selecting content may include selecting base content based on a location within the amusement park attraction and applying corrections to the base content (e.g., scaling and color corrections) based on the ride vehicle characteristics, orientation of the ride vehicle, characteristics of the riders, and the like. The selected content may then be provided to one or more projectors.

The vehicle concealment system selects one or more settings of the projection system at block 504. Settings may generally include frame rate, angle, and/or other physical settings of projectors of the projection system. In some examples, settings may further include a selection of projectors to project content. Such settings may generally be chosen based on characteristics of the ride vehicle being concealed by the projection. For example, an angle of a projector may be chosen based on an orientation of a ride vehicle to be concealed by the projected content. In various examples, the angle of the projection may be further chosen such that a field of projection of the projector overlaps an anticipated field of view of a rider. The anticipated field of view of the rider may be preselected and/or may be adjusted based on characteristics of the individual rider, such as height.

At block 506, the vehicle concealment system conceals the first ride vehicle from a second ride vehicle by projecting the content onto the first ride vehicle using the projection system with the one or more selected settings. Generally, when concealed from the second ride vehicle, the first ride vehicle is masked or otherwise made less noticeable to riders in the second ride vehicle. For example, patterns or colors may be projected onto the first ride vehicle to cause the first ride vehicle to blend into a background of the amusement park attraction. Supplemental content may be provided to draw the rider's attention away from the appearance of the first ride vehicle and onto the content itself being projected onto the first ride vehicle. Generally, the content projected onto the first ride vehicle modifies the appearance of the first ride vehicle as viewed from the second ride vehicle.

FIG. 6 illustrates an additional example process 600 for concealing a ride vehicle using a vehicle concealment system described herein. At block 602, the vehicle concealment system determines that a first ride vehicle is in a visible position relative to a second ride vehicle. For example, a tracking system may track at least the first ride vehicle and the second ride vehicle as the ride vehicles move through the attraction. The tracking system may, in some examples, track the ride vehicles using input from sensors throughout the attraction, integrated into or mounted onto the ride vehicles, or the like.

The vehicle concealment system may utilize the tracked locations of the ride vehicles within an attraction to determine whether any of the ride vehicles are in a visible position relative to one another. For example, locations may be utilized to determine positionings between various ride vehicles, and the determined positionings may be compared against a database or other data structure storing visible positions. When a first ride vehicle is in a visible position relative to a second ride vehicle, the first ride vehicle is generally within the field of view of at least one rider of the second vehicle. In some circumstances, the second ride vehicle may also be within the field of view of at least one rider of the first ride vehicle.

The vehicle concealment system selects one or more settings of a projection system based on the visible position and characteristics of the first ride vehicle at block 604. In various examples, the projection system selects one or more projectors to utilize to conceal the first ride vehicle and then selects settings for the selected projector or projectors. Such projectors may be chosen based on location of the first ride vehicle and the second ride vehicle, locations of nearby projectors, capabilities of the projectors, the content being projected, projectors already in use, and the like. For example, a projector mounted on the second ride vehicle may be chosen where the projector is not already in use and is capable of projecting the desired content in the field of view of the rider in the second ride vehicle.

In some examples, the content that is projected may further be selected based on a location of the ride vehicle within the attraction, such as the location determined by the tracking system. For example, safety information may be projected where the ride vehicle is located in a passenger loading area. In another example, closed captioning text may be provided as a projection onto an adjacent ride vehicle, where the content of the closed captioning text is selected based on a location of the ride vehicle within the attraction. Similarly, patterns or colors projected onto a ride vehicle to conceal the ride vehicle within the attraction may be chosen based on the location of the ride vehicle within the attraction. For example, where the ride vehicle is moving through a section of the attraction themed to look like a forest, a tree or leaf pattern may be projected onto the ride vehicle. In contrast, where the ride vehicle is moving through a section of the attraction themed to look like a desert, a solid neutral color may be projected onto the ride vehicle, such that it blends in with sand colored elements of the attraction.

The projection system may choose additional settings of the projector or projectors. For example, the projection system may determine an angle of a projector projecting content to conceal a first ride vehicle from a second ride vehicle based on an angle or angles between the first ride vehicle and the second ride vehicle. For example, where the first ride vehicle is located up an incline relative to the second ride vehicle, a projector mounted on the second ride vehicle may be tilted upward to conceal the second ride vehicle. A projector may similarly pan or otherwise rotate based on angles between the first ride vehicle and the second ride vehicle.

The projection system may further choose content or settings of the projector based on the shape, color, or other characteristics of the ride vehicle to be concealed. For example, a color of a projection may chosen based on the color of the ride vehicle, such that the ride vehicle appears to be a specific color when combined with the projection. Similarly, content may be chosen to offset different colors of a ride vehicle, such that a multicolored ride vehicle appears as a solid color. Projector settings may similarly be adjusted to scale patterns, text, and/or other projected content based on a shape of the ride vehicle to be concealed. For example, where the ride vehicle has a rounded surface, settings of the projector may be chosen to scale projected content such that it does not appear to be distorted when projected onto a rounded surface.

At block 606, the vehicle concealment system conceals the first ride vehicle from the second ride vehicle using the projection system operating with the selected settings. In various examples, the content projected onto the first ride vehicle may change as the first ride vehicle and the second ride vehicle move through an attraction. For example, where an attraction has several themed areas, the content may update to match the themes as the first ride vehicle and the second ride vehicle move through the attraction.

In some examples, additional projectors may be utilized to conceal the first ride vehicle from the second ride vehicle. For example, where a projector mounted within the environment of the attraction or on another ride vehicle is used (e.g., not mounted on the first ride vehicle or the second ride vehicle), a second projector may be utilized to conceal the first ride vehicle from the second ride vehicle when the first ride vehicle moves outside of an area that can be covered by the original projector. In some examples, additional projectors may be used to project other supplementary content (e.g., animations, text, and the like) as the first ride vehicle and the second ride vehicle move through different areas of an attraction.

In various examples, the content may be projected onto the first ride vehicle as long as the first ride vehicle remains in the line of sight of a rider of the second ride vehicle. That is, the tracking system may continue to monitor locations of the first ride vehicle and the second ride vehicle, and when the first ride vehicle is no longer in a visible position relative to the second ride vehicle, the projection system may turn off the projector or projectors used to conceal the first ride vehicle from the second ride vehicle.

In accordance with the above, a vehicle concealment system may provide an immersive experience for riders while allowing for higher rider volume. Accordingly, the overall experience of riders is improved (e.g., due to lower wait times) without additional programming or routing of ride vehicles to avoid riders becoming distracted by other ride vehicles in the attraction.

The description of certain embodiments included herein is merely exemplary in nature and is in no way intended to limit the scope of the disclosure or its applications or uses. In the included detailed description of embodiments of the present systems and methods, reference is made to the accompanying drawings which form a part hereof, and which are shown by way of illustration specific to embodiments in which the described systems and methods may be practiced. These embodiments are described in sufficient detail to enable those skilled in the art to practice presently disclosed systems and methods, and it is to be understood that other embodiments may be utilized, and that structural and logical changes may be made without departing from the spirit and scope of the disclosure. Moreover, for the purpose of clarity, detailed descriptions of certain features will not be discussed when they would be apparent to those with skill in the art so as not to obscure the description of embodiments of the disclosure. The included detailed description is therefore not to be taken in a limiting sense, and the scope of the disclosure is defined only by the appended claims.

From the foregoing it will be appreciated that, although specific embodiments of the invention have been described herein for purposes of illustration, various modifications may be made without deviating from the spirit and scope of the invention.

The particulars shown herein are by way of example and for purposes of illustrative discussion of the preferred embodiments of the present invention only and are presented in the cause of providing what is believed to be the most useful and readily understood description of the principles and conceptual aspects of various embodiments of the invention. In this regard, no attempt is made to show structural details of the invention in more detail than is necessary for the fundamental understanding of the invention, the description taken with the drawings and/or examples making apparent to those skilled in the art how the several forms of the invention may be embodied in practice.

As used herein and unless otherwise indicated, the terms "a" and "an" are taken to mean "one", "at least one" or "one or more". Unless otherwise required by context, singular terms used herein shall include pluralities and plural terms shall include the singular.

Unless the context clearly requires otherwise, throughout the description and the claims, the words 'comprise', 'comprising', and the like are to be construed in an inclusive sense as opposed to an exclusive or exhaustive sense; that is to say, in the sense of "including, but not limited to". Words using the singular or plural number also include the plural and singular number, respectively. Additionally, the words "herein," "above," and "below" and words of similar import, when used in this application, shall refer to this application as a whole and not to any particular portions of the application.

Of course, it is to be appreciated that any one of the examples, embodiments or processes described herein may be combined with one or more other examples, embodiments and/or processes or be separated and/or performed amongst separate devices or device portions in accordance with the present systems, devices and methods.

Finally, the above discussion is intended to be merely illustrative of the present system and should not be construed as limiting the appended claims to any particular embodiment or group of embodiments. Thus, while the present system has been described in particular detail with reference to exemplary embodiments, it should also be appreciated that numerous modifications and alternative embodiments may be devised by those having ordinary skill in the art without departing from the broader and intended spirit and scope of the present system as set forth in the claims that follow. Accordingly, the specification and drawings are to be regarded in an illustrative manner and are not intended to limit the scope of the appended claims.

What is claimed is:

1. A method of concealing a first ride vehicle in an amusement park attraction from a second ride vehicle in the amusement park attraction, the method comprising:

selecting content to project onto the first ride vehicle based at least on a characteristic of the first ride vehicle; and projecting the selected content onto the first ride vehicle, wherein an appearance of the first ride vehicle is modified as viewed from the second ride vehicle by the projected content.

2. The method of claim 1, wherein the content is configured to conceal the appearance of the first ride vehicle as viewed from the second ride vehicle.

3. The method of claim 1, wherein the content is further selected based on a location of the first ride vehicle within the amusement park attraction.

4. The method of claim 1, wherein the projection system comprises at least one of:

one or more projectors mounted on the second ride vehicle; or one or more projectors mounted on a stationary structure within the amusement park attraction.

5. The method of claim 1, wherein projecting the selected content onto the first ride vehicle comprises projecting first content onto the first ride vehicle at a first location within the amusement park attraction and projecting second content onto the first ride vehicle at a second location within the amusement park attraction.

6. The method of claim 1, further comprising:

determining that the first ride vehicle is in a visible position relative to the second ride vehicle, wherein at least a portion of the first ride vehicle is visible by an occupant of the second ride vehicle when the first ride vehicle is in the visible position relative to the second ride vehicle, wherein the selected content is projected onto the first ride vehicle responsive to the determination that the first ride vehicle is in the visible position relative to the second ride vehicle.

7. The method of claim 6, further comprising:

selecting one or more settings of the projection system based on the visible position, wherein the selected content is projected onto the first ride vehicle using the one or more settings.

8. The method of claim 7, wherein the visible position includes at least an angle between the first ride vehicle and the second ride vehicle, wherein selecting the one or more settings of the projection system comprises selecting at least one projector of the projection system based on the angle between the first ride vehicle and the second ride vehicle.

9. The method of claim 6, wherein the visible position includes a visible angle and a visible distance between the first ride vehicle and the second ride vehicle.

10. An amusement park attraction comprising:

a first ride vehicle;

a second ride vehicle; and a projection system configured to conceal the first ride vehicle from the second ride vehicle by projecting content onto the first ride vehicle, wherein the content is selected based at least on a characteristic of the first ride vehicle.

11. The amusement park attraction of claim 10, wherein the projection system comprises one or more projectors mounted on the second ride vehicle.

12. The amusement park attraction of claim 10, wherein the projection system is configured to project first content onto the first ride vehicle at a first location within the amusement park attraction and to project second content onto the first ride vehicle at a second location within the amusement park attraction.

13. The amusement park attraction of claim 10, further comprising:

one or more tracking systems configured to track a location of the first ride vehicle and a location of the second ride vehicle within the amusement park attraction, wherein the content is further selected based on at least one of the location of the first ride vehicle or the location of the second ride vehicle.

14. The amusement park attraction of claim 13, wherein the projection system comprises one or more projectors, wherein the projection system is configured to select one or more settings for the one or more projectors based on the location of the first ride vehicle and the location of the second ride vehicle.

15. The amusement park attraction of claim 10, wherein the projection system is configured to project the content onto the first ride vehicle responsive to a detection that the first ride vehicle is in a visible position relative to the second ride vehicle.

16. A vehicle concealment system for use in an amusement park attraction, the vehicle concealment system comprising:

a projection control system configured to select content to conceal a first ride vehicle of the amusement park attraction from a second ride vehicle of the amusement park attraction, wherein the content is selected based at least on a characteristic of the first ride vehicle; and one or more projectors configured to conceal the first ride vehicle from the second ride vehicle by projecting the content onto the first ride vehicle.

17. The vehicle concealment system of claim 16, wherein at least one of the one or more projectors is mounted to the second ride vehicle.

18. The vehicle concealment system of claim 16, further comprising one or more tracking systems configured to track a location of the first ride vehicle and a location of the second ride vehicle within the amusement park attraction, wherein the content is further selected based on the location 5 of the first ride vehicle within the amusement park attraction.

19. The vehicle concealment system of claim 18, wherein the projection control system is further configured to select second content to conceal the first ride vehicle from the second ride vehicle at a second location of the first ride 10 vehicle in the amusement park attraction, wherein the second content is selected based on the second location.

20. The vehicle concealment system of claim 16, wherein the projection control system is further configured to select the content based on one or more characteristics of the first 15 ride vehicle.

* * * * *